(12) United States Patent
Chiken

(10) Patent No.: US 11,536,600 B2
(45) Date of Patent: Dec. 27, 2022

(54) CORIOLIS FLOWMETER, TIMING PREDICTION SYSTEM, AND TIMING PREDICTION METHOD

(71) Applicant: Yokogawa Electric Corporation, Tokyo (JP)

(72) Inventor: Yoshihiro Chiken, Tokyo (JP)

(73) Assignee: Yokogawa Electric Cornoration, Tokyo (JP)

(*) Notice: Subject to any disclaimer, the term of this patent is extended or adjusted under 35 U.S.C. 154(b) by 1025 days.

(21) Appl. No.: 16/242,111

(22) Filed: Jan. 8, 2019

(65) Prior Publication Data

US 2019/0242737 A1    Aug. 8, 2019

(30) Foreign Application Priority Data

Feb. 5, 2018    (JP) .............................. JP2018-018395

(51) Int. Cl.
*G01F 1/84* (2006.01)
*G01F 25/10* (2022.01)

(52) U.S. Cl.
CPC .......... *G01F 1/8459* (2013.01); *G01F 1/8436* (2013.01); *G01F 25/10* (2022.01)

(58) Field of Classification Search
None
See application file for complete search history.

(56) References Cited

U.S. PATENT DOCUMENTS

| 5,926,096 | A | * | 7/1999 | Mattar | G01F 1/8413 340/606 |
| 6,799,154 | B1 | * | 9/2004 | Aragones | G06F 11/008 703/22 |
| 2007/0095153 | A1 | | 5/2007 | Rieder et al. | |
| 2011/0277559 | A1 | * | 11/2011 | Miyaji | G01F 25/10 73/861.355 |
| 2019/0242737 | A1 | | 8/2019 | Chiken | |

FOREIGN PATENT DOCUMENTS

JP    4952820 B2    6/2012

* cited by examiner

*Primary Examiner* — Brent A. Fairbanks
(74) *Attorney, Agent, or Firm* — Sughrue Mion, PLLC

(57) ABSTRACT

A Coriolis flowmeter includes a change ratio obtainer configured to obtain a change ratio of vibration of a vibration tube when the vibration tube is vibrated with a constant driving force by causing a switch to select a fixed gain setting voltage, a calculator configured to calculate a first parameter indicating at least one of a spring constant of the vibration tube and a damping coefficient of the vibration tube on the basis of the change ratio obtained by the change ratio obtainer and the constant driving force, and a predictor configured to predict at least one of a time, an operating time, and an integrated flow rate of a fluid flowing in the vibration tube required for a state of the vibration tube to become a state requiring maintenance, using the first parameter calculated by the calculator or a second parameter obtained by performing a predetermined calculation on the first parameter.

20 Claims, 8 Drawing Sheets

OUTPUT SIGNAL OF CORIOLIS SENSOR UNIT AT TIME OF NORMAL OPERATION

OUTPUT SIGNAL OF CORIOLIS SENSOR UNIT WHEN AMPLITUDE IS ATTENUATED

OUTPUT SIGNAL OF CORIOLIS SENSOR UNIT WHEN AMPLITUDE GROWS

CORIOLIS FLOWMETER, TIMING PREDICTION SYSTEM, AND TIMING PREDICTION METHOD

BACKGROUND

Technical Fields

The present invention relates to a Coriolis flowmeter, a timing prediction system, and a timing prediction method.

Priority is claimed on Japanese Patent Application No. 2018-018395, filed Feb. 5, 2018, the contents of which are incorporated herein by reference.

Related Art

A Coriolis flowmeter is known as one type of flowmeter used in a plant. The Coriolis flowmeter vibrates a U-shaped tube through which fluid flows by means of excitation of a coil, and measures Coriolis force generated by the fluid flowing through the U-shaped tube on the basis of torsion of the U-shaped tube. Since the Coriolis force increases in accordance with a flow rate of the fluid, the flow rate can be measured on the basis of a width or a phase of the torsion of the U-shaped tube.

The Coriolis flowmeter measures the flow rate by utilizing the torsion of the U-shaped tube. Therefore, if corrosion of the U-shaped tube progresses, an error in measurement of the flow rate occurs. Further, adhered substances adhered to the inside of the U-shaped tube causes an error in measurement of the flow rate. Furthermore, in view of maintenance of the U-shaped tube, it is desirable to check the state of corrosion and adhered substances.

Japanese Patent No. 4952820 discloses a Coriolis flowmeter which is capable of individually diagnosing state of corrosion and adhered substances of a U-shaped tube. Specifically, the Coriolis flowmeter disclosed in Japanese Patent No. 4952820 obtains a change ratio of the vibration of the U-shaped tube when a driving force with a fixed oscillation feedback gain is applied to the U-shaped tube, calculates a spring constant and a damping coefficient of the U-shaped tube as mutually individual parameters on the basis of the obtained change ratio and the driving force applied to the U-shaped tube, and diagnoses the state of corrosion and adhered substances of the U-shaped tube individually on the basis of the calculated parameters. The Coriolis flowmeter disclosed in Japanese Patent No. 4952820 diagnoses the state of corrosion of the U-shaped tube on the basis of the calculated spring constant. Further, the Coriolis flowmeter disclosed in Japanese Patent No. 4952820 diagnoses the state of adhered substances adhered to the U-shaped tube on the basis of the calculated damping coefficient.

Since the Coriolis flowmeter disclosed in Japanese Patent No. 4952820 can individually diagnose the state of corrosion and adhered substances of the U-shaped tube, if the state of corrosion and the state of adhered substances of the U-shaped tube become worse, the Coriolis flowmeter can generate an alarm representing the worsening individually. By generating such an alarm, a worker can grasp a fact that the state of the Coriolis flowmeter becomes worse, a cause of the worsening, and a necessity of maintenance of the Coriolis flowmeter. When the alarm is generated, the worker replaces the Coriolis flowmeter including the U-shaped tube, for example.

However, when the Coriolis flowmeter is replaced, it may take a long time to deliver a new Coriolis flowmeter to the user due to manufacturing, adjustment, and transportation of the Coriolis flowmeter. For this reason, even if the worker can grasp the necessity of replacing the Coriolis flowmeter by the generated alarm, there is a case that the maintenance is carried out after a certain time has elapsed since the alarm was generated.

Further, since the Coriolis flowmeter is expensive in comparison with other flowmeters, there is a case that it is required to replace in a planned manner. Therefore, if the replacement is started after the alarm has been generated, the period during which the facility in which the Coriolis flowmeter is installed cannot be operated may become long, or it may become difficult to replace the Coriolis flowmeter.

There are many cases that corrosion of the U-shaped tube and adhesion to the U-shaped tube progress gradually over a long period of time. On the basis of only the alarm, it can be grasped that the state of corrosion of the U-shaped tube and the state of adhered substances have become worse, but the progress of corrosion of the U-shaped tube and the adhesion to the U-shaped tube cannot be grasped. If it is possible to grasp the progress of corrosion of the U-shaped tube and the adhesion to the U-shaped tube, the user can grasp the time when a maintenance is required in advance, and the user can prepare for the maintenance. Therefore, it is thought that the above-described problem can be solved.

SUMMARY

A Coriolis flowmeter may include a Coriolis sensor unit configured to detect a vibration of a vibration tube to output a first output signal, a current amplifier configured to supply a drive current for vibrating the vibration tube to the Coriolis sensor unit, an amplifier configured to amplify the first output signal output from the Coriolis sensor unit to output a second output signal, a smoother configured to smooth the second output signal output from the amplifier to output a third output signal, a control amplifier configured to amplify a difference between the third output signal output from the smoother and a target voltage to output a fourth output signal, a voltage setter configured to output a fixed gain setting voltage, a switch configured to select one signal of the fourth output signal output from the control amplifier and the fixed gain setting voltage output from the voltage setter, a multiplier configured to multiply the second output signal output from the amplifier by the signal selected by the switch to output a fifth output signal to the current amplifier, and a calculation controller configured to control the voltage setter and the switch. The current amplifier is configured to amplify the fifth output signal output from the multiplier to generate the drive current. The calculation controller may include a change ratio obtainer configured to obtain a change ratio of the vibration of the vibration tube when the vibration tube is vibrated with a constant driving force by causing the switch to select the fixed gain setting voltage, a calculator configured to calculate a first parameter indicating at least one of a spring constant of the vibration tube and a damping coefficient of the vibration tube on the basis of the change ratio obtained by the change ratio obtainer and the constant driving force, and a predictor configured to predict at least one of a time, an operating time, and an integrated flow rate of a fluid flowing in the vibration tube required for a state of the vibration tube to become a state requiring maintenance, using the first parameter calculated by the calculator or a second parameter obtained by performing a predetermined calculation on the first parameter.

Further features and aspects of the present disclosure will become apparent from the following detailed description of exemplary embodiments with reference to the attached drawings.

DETAILED DESCRIPTION OF THE EMBODIMENTS

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide a Coriolis flowmeter, a timing prediction system, and a timing prediction method which can accurately predict a timing when maintenance is required.

Hereinafter, a Coriolis flow meter, a timing prediction system, and a timing prediction method according to an embodiment of the present invention will be described in detail with reference to drawings.

First Embodiment

<Configuration of Coriolis Flow Meter>

Figure 1:
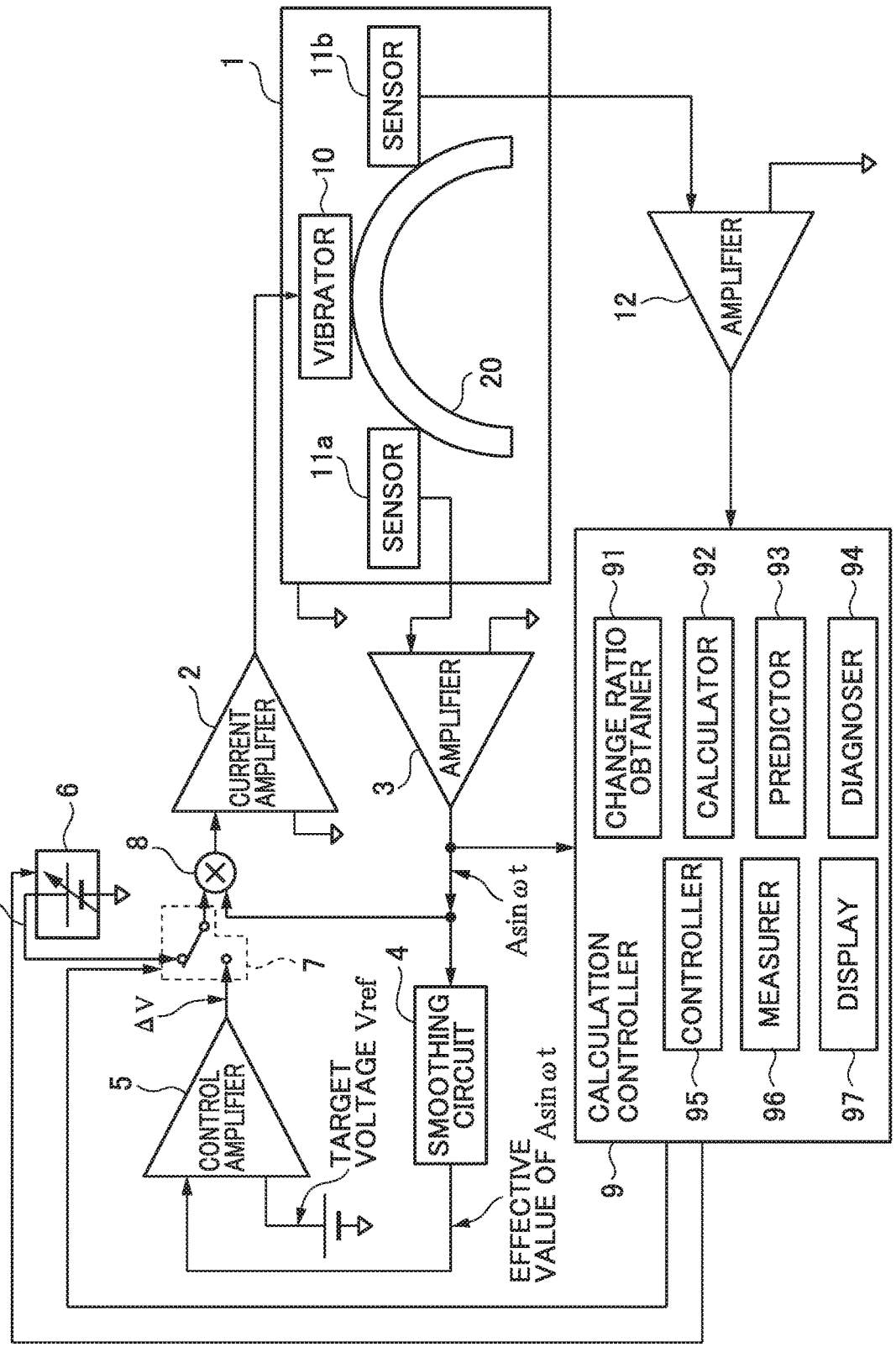
FIG. 1 is a block diagram showing a configuration of a main part of a Coriolis flowmeter according to a first embodiment of the present invention.

FIG. 1 is a block diagram showing a configuration of a main part of a Coriolis flowmeter according to a first embodiment of the present invention. As shown in FIG. 1, the Coriolis flowmeter of the present embodiment includes a Coriolis sensor unit 1, a current amplifier 2, an amplifier 3, a smoothing circuit 4, a control amplifier 5, a voltage setter 6, a switch 7, a multiplier 8, a calculation controller 9, and an amplifier 12.

The Coriolis sensor unit 1 includes a U-shaped tube 20 (vibration tube), a vibrator 10 (driver), and sensors 11a and 11b. The U-shaped tube 20 is a tube having a U-shape made of a bendable material, such as metal (for example, stainless steel), resin, rubber or the like. A fluid to be measured flows in the U-shaped tube 20. The vibrator 10 vibrates the U-shaped tube 20 in accordance with a drive current supplied from the current amplifier 2.

The sensors 11a and 11b are sensors for detecting the vibration of the U-shaped tube 20. These sensors 11a and 11b output a voltage corresponding to the vibration of the U-shaped tube 20 to the amplifier 3. The Coriolis flowmeter of the present embodiment can diagnose the state of the U-shaped tube 20 (whether it has become worse to the extent that maintenance is required) by using only one of the sensors 11a and 11b, and can accurately predict the timing when the maintenance of the Coriolis flowmeter is required. Hereinafter, using only the sensor 11a, the state of the U-shaped tube 20 is diagnosed, and the maintenance timing of the Coriolis flowmeter is predicted. Even if only the sensor 11b is used, prediction and diagnosis can be performed as in the case where only the sensor 11a is used.

The current amplifier 2 amplifies an output signal of the multiplier 8 and generates a drive current for driving the U-shaped tube 20. The drive current generated by the current amplifier 2 is output to the vibrator 10 of the Coriolis sensor unit 1. The amplifier 3 amplifies and outputs an output signal of the Coriolis sensor unit 1 (an output signal of the sensor 11a). The output signal from the amplifier 3 is also used as a signal for detecting a Coriolis force (amplitude and phase of the torsion of the U-shaped tube 20).

The smoothing circuit 4 smooths the output signal from the amplifier 3, and outputs a signal indicating an amplitude of the output signal from the amplifier 3. The control amplifier 5 amplifies a difference between an output signal from the smoothing circuit 4 and a predetermined target voltage Vref. Under the control of the calculation controller 9, the voltage setter 6 outputs a fixed gain setting voltage E for giving a constant gain (fixed gain) to a circuit loop including the current amplifier 2, the Coriolis sensor unit 1, the amplifier 3, and the multiplier 8. The value of the fixed gain setting voltage E can be changed by the calculation controller 9. Therefore, the fixed gain given to the circuit loop can also be changed by the calculation controller 9.

The switch 7 has a first input terminal connected to the output terminal of the control amplifier 5, a second input terminal connected to the output terminal of the voltage setter 6, and a single output terminal connected to the input terminal of the multiplier 8. The switch 7 connects either one of the first input terminal and the second input terminal to the output terminal under the control of the calculation controller 9. That is, the switch 7 selects one of an output signal ΔV from the control amplifier 5 and the fixed gain setting voltage E output from the voltage setter 6, and outputs it to the multiplier 8. Hereinafter, the signal selected by the switch 7 will be called as "oscillation feedback current gain G (oscillation feedback gain)". The multiplier 8 multiplies the output signal from the amplifier 3 by the signal selected by the switch 7, and outputs the multiplied signal to the current amplifier 2.

The calculation controller 9 includes a change ratio obtainer 91, a calculator 92, a predictor 93, a diagnoser 94, a controller 95, a measurer 96, and a display 97. The calculation controller 9 diagnoses the state of the U-shaped tube 20, and performs calculation and control necessary for predicting the maintenance timing of the Coriolis flowmeter. Although not shown in FIG. 1, an output signal of the smoothing circuit 4 and an output signal of the control amplifier 5 are input to the calculation controller 9.

The change ratio obtainer 91 obtains a change ratio of the vibration of the U-shaped tube 20 when the vibrator 10 applies, to the U-shaped tube 20, the driving force with the fixed oscillation feedback current gain. The calculator 92 calculates a spring constant and a damping coefficient of the U-shaped tube 20, as mutually individual parameters (first parameter), on the basis of the change ratio obtained by the change ratio obtainer 91 and the driving force applied to the U-shaped tube 20. In the present embodiment, an example in which the spring constant and the damping coefficient are calculated as mutually individual parameters will be described, but only one of the spring constant and the damping coefficient may be calculated as an individual parameter.

Using the parameter calculated by the calculator 92, the predictor 93 predicts a time required for the state of the U-shaped tube 20 to become a state requiring maintenance, but it is not limited thereto. For example, the predictor 93 may predict an operation time or an integrated flow rate of the fluid required for the state of the U-shaped tube 20 to become a state requiring maintenance. The diagnoser 94 diagnoses the state of the U-shaped tube 20 on the basis of the parameter calculated by the calculator 92. The controller 95 controls the voltage setter 6 and the switch 7. Details of the calculation and control performed by the calculation controller 9 will be described later.

<Operation of Coriolis Flowmeter>

The operation of the Coriolis flowmeter includes an operation (hereinafter, called as "normal operation") of measuring the flow rate of the fluid flowing in the U-shaped tube 20 and an operation (hereinafter, called as "predictive diagnosis operation") of diagnosing the state of the U-shaped tube 20 and predicting the maintenance timing of the Coriolis flowmeter. Hereinafter, an outline of these operations will be described in order.

<<Normal Operation>>

In the normal operation, the switch 7 is controlled by the controller 95 provided in the calculation controller 9, and the output signal ΔV from the control amplifier 5 is selected by the switch 7. Thereafter, the output signal ΔV from the control amplifier 5 changes in accordance with the output signal (amplitude) from the smoothing circuit 4, and the circuit loop (the current amplifier 2, the Coriolis sensor unit 1, the amplifier 3, the smoothing circuit 4, the control amplifier 5, the switch 7, and the multiplier 8) functions to make the output signal from the smoothing circuit 4 be equal to the target voltage Vref. The oscillation feedback current gain G at this time will be called as an oscillation feedback current gain G0. In a steady state, this circuit loop oscillates with a constant amplitude, and the U-shaped tube 20 vibrates with a constant amplitude. In this state, the measurer 96 detects the torsion of the U-shaped tube 20 and measures the flow rate of the fluid flowing in the U-shaped tube 20.

Specifically, the amplifier 3 amplifies the signal output from the sensor 11a of the Coriolis sensor unit 1, and outputs the amplified signal to the calculation controller 9. Further, the amplifier 12 amplifies the signal output from the sensor 11b of the Coriolis sensor unit 1, and outputs the amplified signal to the calculation controller 9. A phase difference between these signals input into the calculation controller 9 changes in accordance with the flow rate of the fluid flowing in the U-shaped tube 20. Therefore, on the basis of the phase difference between these signals (specifically, the phase difference between the signal output from the sensor 11a and the signal output from the sensor 11b), the measurer 96 of the calculation controller 9 measures the flow rate of the fluid flowing through the U-shaped tube 20.

Figure 2A:
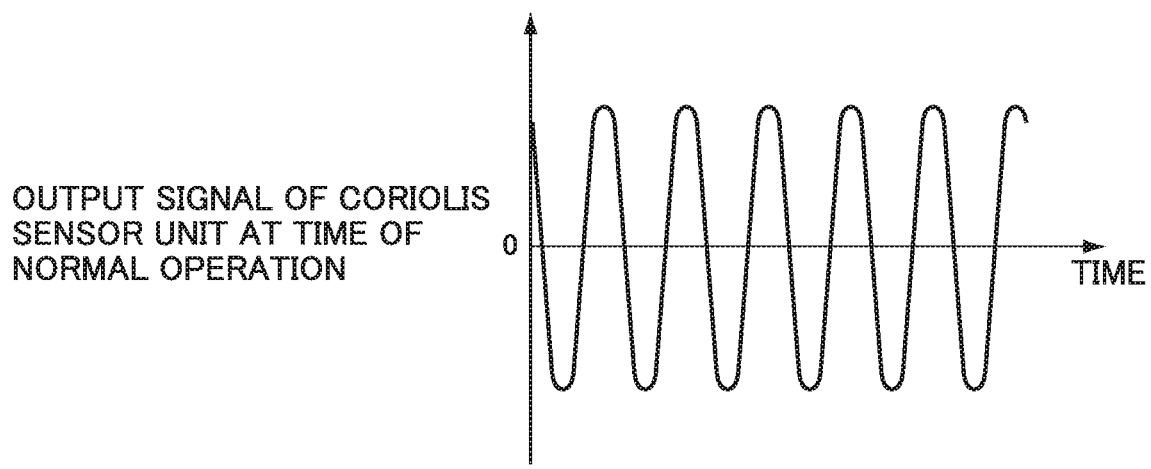
FIG. 2A is a diagram showing an output signal from the Coriolis sensor unit in a normal state.
Figure 2B:
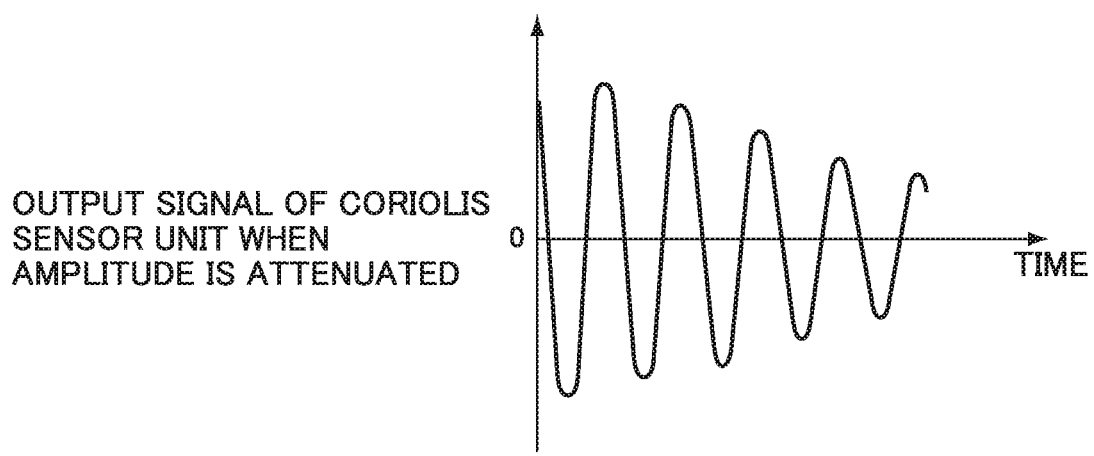
FIG. 2B is a diagram showing an output signal of the Coriolis sensor unit when the amplitude attenuates.
Figure 2C:
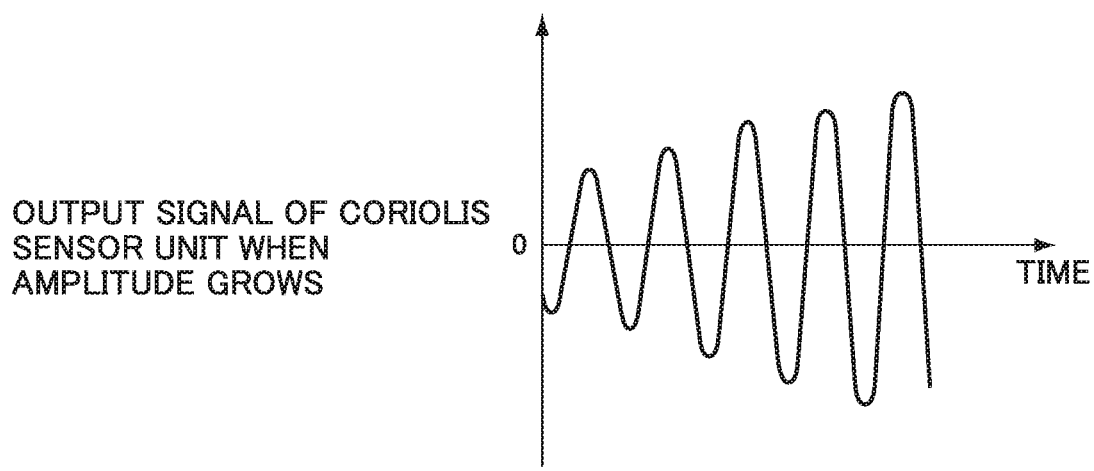
FIG. 2C is a diagram showing an output signal of the Coriolis sensor unit when the amplitude grows.

FIG. 2A to FIG. 2C are diagrams showing output signals from the Coriolis sensor unit. Specifically, FIG. 2A is a diagram showing an output signal in the normal operation, and FIG. 2B and FIG. 2C are diagrams showing an output signal in the predictive diagnosis operation. As shown in FIG. 2A, the output signal from the Coriolis sensor unit 1 during the normal operation has a substantially constant amplitude in accordance with the amplitude of the U-shaped tube 20.

<<Predictive Diagnosis Operation>>

In the predictive diagnosis operation, the switch 7 is controlled by the controller 95 provided in the calculation controller 9, and the fixed gain setting voltage E output from the voltage setter 6 is selected by the switch 7. Further, the voltage setter 6 is controlled by the controller 95 provided in the calculation controller 9, and the fixed gain setting voltage E is set to a predetermined fixed value for attenuating or growing the vibration of the U-shaped tube 20 attenuates or grows.

If the fixed gain setting voltage E is set to a value for attenuating the vibration of the U-shaped tube 20, as shown in FIG. 2B, the amplitude of the output signal from the Coriolis sensor unit 1 gradually decreases as the vibration of the U-shaped tube 20 attenuates. On the other hand, if the fixed gain setting voltage E is set a value for growing the vibration of the U-shaped tube 20, as shown in FIG. 2C, the amplitude of the output signal from the Coriolis sensor unit 1 gradually increases as the vibration of the U-shaped tube 20 grows.

<Principle of Parameter Calculation>

The Coriolis flowmeter of the present embodiment sequentially switches the oscillation feedback current gain G to G1 and G2. Thus, the Coriolis flowmeter of the present embodiment calculates grows and attenuates the vibration of the U-shaped tube 20 to calculate a growth ratio and an attenuation ratio of the amplitude, and finally calculates a spring constant K and a damping coefficient D as mutually different parameters (first parameter). A principle of calculating the spring constant K and the damping coefficient D will be described below.

First, a vibration equation of the U-shaped tube 20 is expressed by the equation (1).

$$M\frac{d^2x}{dt^2} + D\frac{dx}{dt} + Kx = G\frac{dx}{dt} \qquad (1)$$

Here, x represents a displacement of the vibration of the U-shaped tube 20, M represents an entire mass of the U-shaped tube 20, D represents a damping coefficient, K represents a spring constant of the U-shaped tube 20, G represents an oscillation feedback current gain, w represents an angular frequency, and A represents an amplitude. In addition, $\zeta=(D/M)\times(1/2\omega)$.

$$"G\frac{dx}{dt}"$$

on the right side of the equation (1) corresponds to an acting force on the basis of the drive current applied from the current amplifier 2 to the Coriolis sensor unit 1, and "G" is set in accordance with the output signal ΔV from the control amplifier 5 and the fixed gain setting voltage E.

When both sides of the equation (1) are divided by M, the equation (2) is obtained. Since $D/M=1\zeta\Omega$ and $\omega$=sqrt (K/M), the equation (3) is obtained. By deforming the equation (3), the equation (4) is obtained. The equation (5) is also obtained in accordance with the equations (3) and (4).

$$\frac{d^2x}{dt^2} + \frac{D}{M}\frac{dx}{dt} + \frac{K}{M}x = \frac{G}{M}\frac{dx}{dt} \quad (2)$$

$$\frac{d^2x}{dt^2} + 2\zeta\omega\frac{dx}{dt} + \omega^2 x = \frac{G}{M}\frac{dx}{dt} \quad (3)$$

$$\frac{d^2x}{dt^2} + \left(2\zeta\omega - \frac{G}{M}\right)\frac{dx}{dt} + \omega^2 x = 0 \quad (4)$$

$$x = A\exp\left(-\zeta\omega + \frac{G}{2M}\right)t \times \sin(\omega t) \quad (5)$$

In this way, the displacement x of the vibration of the U-shaped tube 20 has a waveform of a sine wave attenuating or growing. Also, the output signal from the Coriolis sensor unit 1, which is proportional to the displacement x of the vibration of the U-shaped tube 20, has a waveform of a sine wave attenuating or growing likewise.

α1 (>1) is a change ratio of an integral value of a square value of the output value from the Coriolis sensor unit 1 when the oscillation feedback current gain G is G1 (G1>G0). Also, α2 (<1) is a change ratio of an integral value of a square value of the output value from the Coriolis sensor unit 1 when the oscillation feedback current gain G is G2 (G0>G2). In this case, α1 is expressed by the equation (6), and α2 is expressed by the equation (7). The equation (8) is obtained from the equations (6) and (7).

$$\alpha 1 = -2\zeta\omega + \frac{G1}{M} \quad (6)$$

$$\alpha 2 = -2\zeta\omega + \frac{G2}{M} \quad (7)$$

$$M = \frac{G1 - G2}{\alpha 1 - \alpha 2} \quad (8)$$

The change ratio (>1) indicates a growth of the amplitude, and the change ratio (<1) indicates an attenuation of the amplitude.

In such a procedure, the spring constant K can be calculated in accordance with the equation (9), and the damping coefficient D can be calculated in accordance with the equation (10).

$$K = M \times \omega^2 \quad (9)$$

$$D = G1 - \alpha 1 \times M \quad (10)$$

<Predictive Diagnosis Operation>

Figure 3:
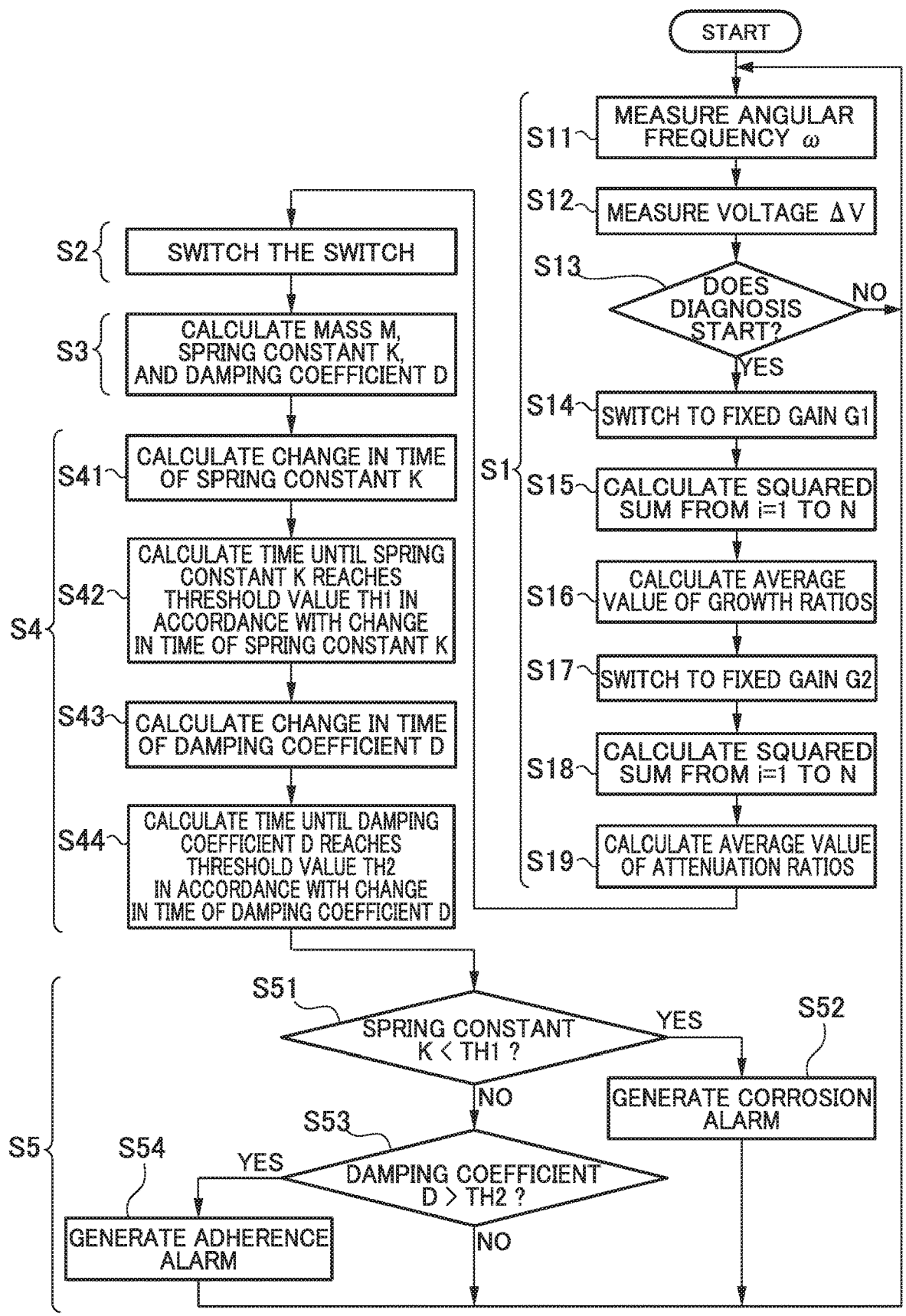
FIG. 3 is a flowchart showing details of the predictive diagnosis operation.

FIG. 3 is a flowchart showing details of the predictive diagnosis operation. For example, the flowchart shown in FIG. 3 is started when the user instructs to start the predictive diagnosis. As shown in FIG. 3, the flow of the predictive diagnosis operation includes a change ratio obtaining step S1, a switch switching step S2, a calculation step S3, a prediction step S4, and a diagnosis step S5.

The change ratio obtaining step S1 is a step of obtaining a change ratio of vibration of the U-shaped tube 20 when a driving force with a constant oscillation feedback current gain is applied to the U-shaped tube 20 by the vibrator 10. The switch switching step S2 is a step of switching the switch 7. The calculation step S3 is a step of calculating the spring constant and the damping coefficient of the U-shaped tube 20, as mutually individual parameters (first parameter), on the basis of the change ratio obtained in the change ratio obtaining step S1 and the driving force applied to the U-shaped tube 20.

The prediction step S4 is a step of predicting a time, an operation time, or an integrated flow rate required for the state of the U-shaped tube 20 to become a state requiring maintenance using the parameters calculated in the calculation step S3. In the present embodiment, an example where the time (the time required for the state of the U-shaped tube 20 to become a state requiring maintenance) is predicted in the prediction step S4 will be described. The diagnosis step S5 is a step of diagnosing the state of U-shaped tube 20 on the basis of the parameters calculated in the calculation step S3. Each of these steps will be described in detail below.

The change ratio obtaining step S1 includes steps S11 to S19. The change ratio obtaining step S1 is performed in cooperation with the change ratio obtainer 91 and the controller 95 of the calculation controller 9. When the change ratio obtaining step S1 is started, the output signal ΔV from the control amplifier 5 is selected by the switch 7, and the normal operation is performed. First, in the step S11, the change ratio obtainer 91 measures the angular frequency ω in the normal operation. The angular frequency w can be measured on the basis of the output signal (A sin(ωt)) from the amplifier 3. Next, in the step S12, the change ratio obtainer 91 measures the output signal ΔV from the control amplifier 5. As a result, the oscillation feedback current gain G in the normal operation can be obtained.

Next, in the step S13, the controller 95 determines whether or not a diagnosis start time t0 has been reached. When the controller 95 determines that the diagnosis start time t0 has not been reached (the determination result is "NO"), the process returns to the step S11. On the other hand, if the controller 95 determines that the diagnosis start time t0 has been reached (the determination result is "YES"), the process proceeds to the step S14. In the step S14, the controller 95 switches the switch 7 from a side of selecting the output signal ΔV from the control amplifier 5 to a side of selecting the fixed gain setting voltage E which is the output value from the voltage setter 6. Further, the controller 95 sets the value of the fixed gain setting voltage E of the voltage setter 6 to a value at which the oscillation feedback current gain G becomes G1. As a result, the change ratio α of the integral value of the square value of the output value from the Coriolis sensor unit 1 becomes α1 (>1).

Figure 4A:
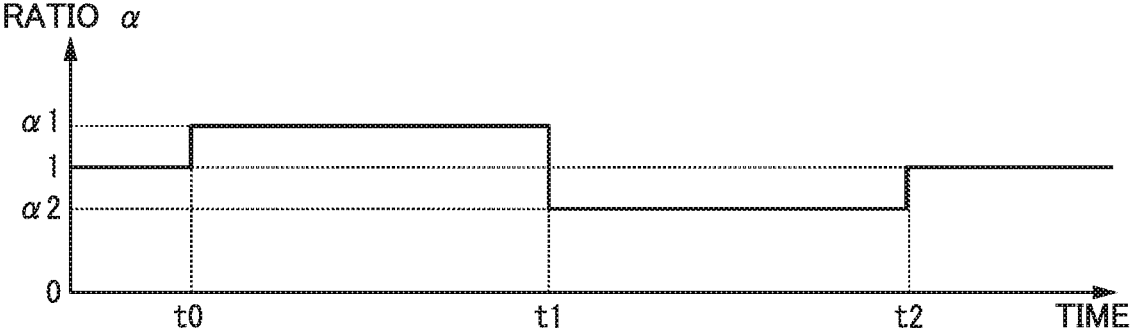
FIG. 4A is a diagram showing a change with time of the change ratio of the integral value of the square value of the output value from the Coriolis sensor unit in the predictive diagnosis operation.
Figure 4B:
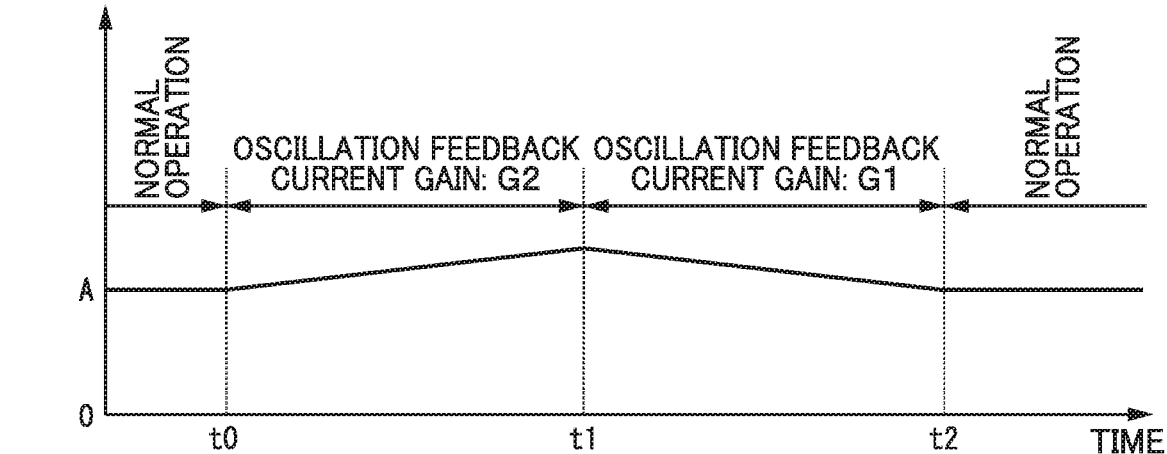
FIG. 4B is a diagram showing a change with time of the amplitude of the signal obtained by amplifying the output value from the Coriolis sensor unit in the predictive diagnosis operation by the amplifier.
Figure 4C:
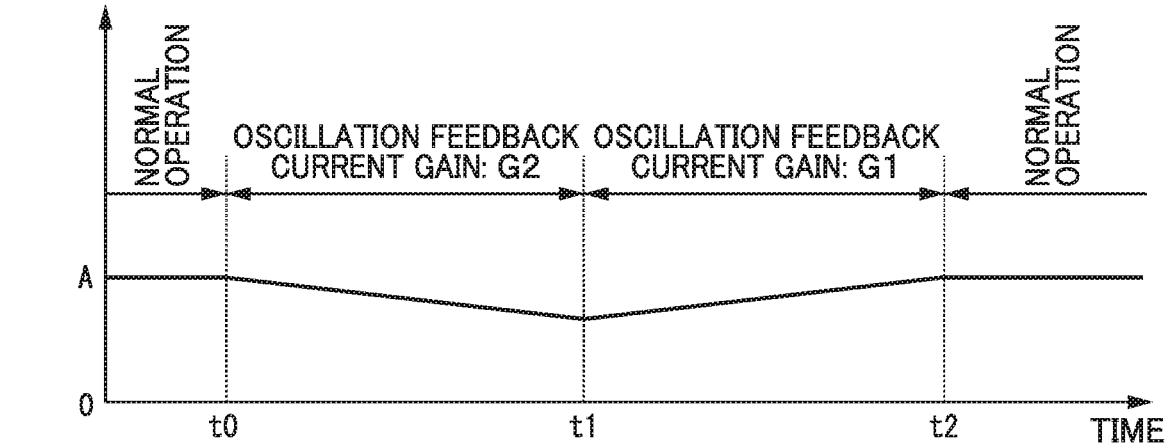
FIG. 4C is a diagram showing a change with time of the amplitude of the signal obtained by amplifying the output value from the Coriolis sensor unit in the predictive diagnosis operation by the amplifier.

FIG. 4A to 4C are diagrams showing changes with time of the output value from the Coriolis sensor unit in the predictive diagnosis operation. FIG. 4A is a diagram showing a change with time of the change ratio α of the integral value of the square value of the output value from the Coriolis sensor unit. FIG. 4B is a diagram showing a change with time of the amplitude of the signal obtained by amplifying the output value from the Coriolis sensor unit by the amplifier 3. As shown in FIG. 4A, the change ratio α switches from 1 to α1 (>1) at the time t0. Further, as shown in FIG. 4B, the amplitude of the output signal (A sin(ωt)) from the amplifier 3, which has maintained a substantially constant value until the time t0, starts to increase from the time t0.

Next, in the step S15, the change ratio obtainer 91 calculates the change ratio (growth ratio) of the amplitude of the sine wave output from the amplifier 3 for each of the periods i=1 to N (i and N are integers) until the time t1 has been reached (specifically, for L seconds). Next, in the step S16, the change ratio obtainer 91 calculates an average value of the change ratios calculated in the step S15.

Figure 5A:
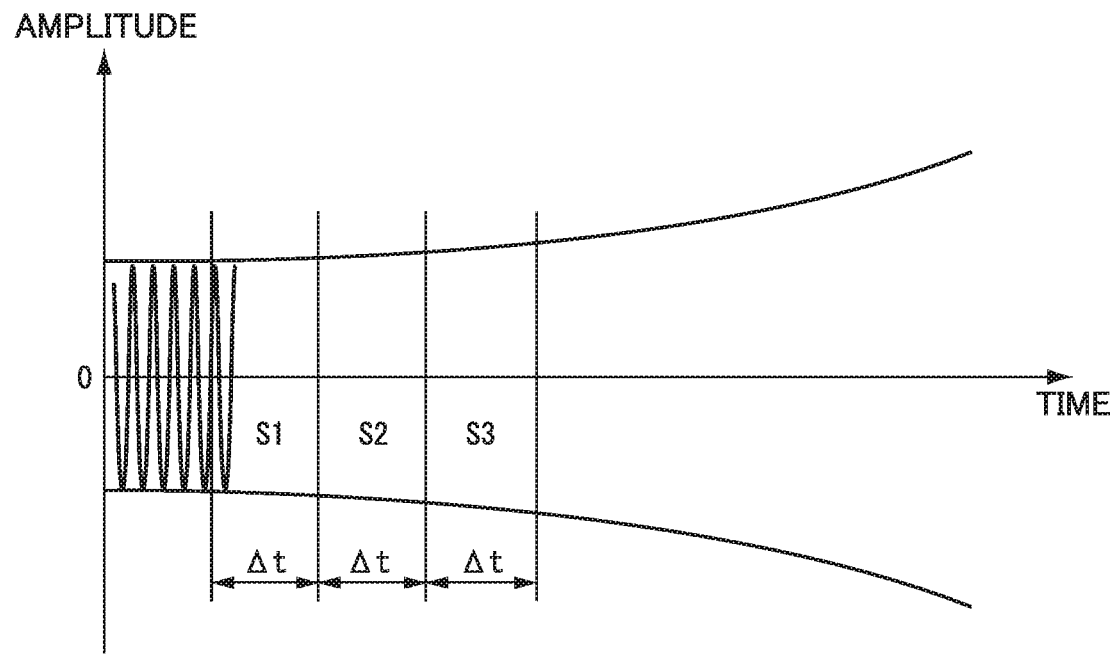
FIG. 5A is a diagram for explaining a process executed in the step S15 of the flowchart shown in FIG. 3.
Figure 5B:
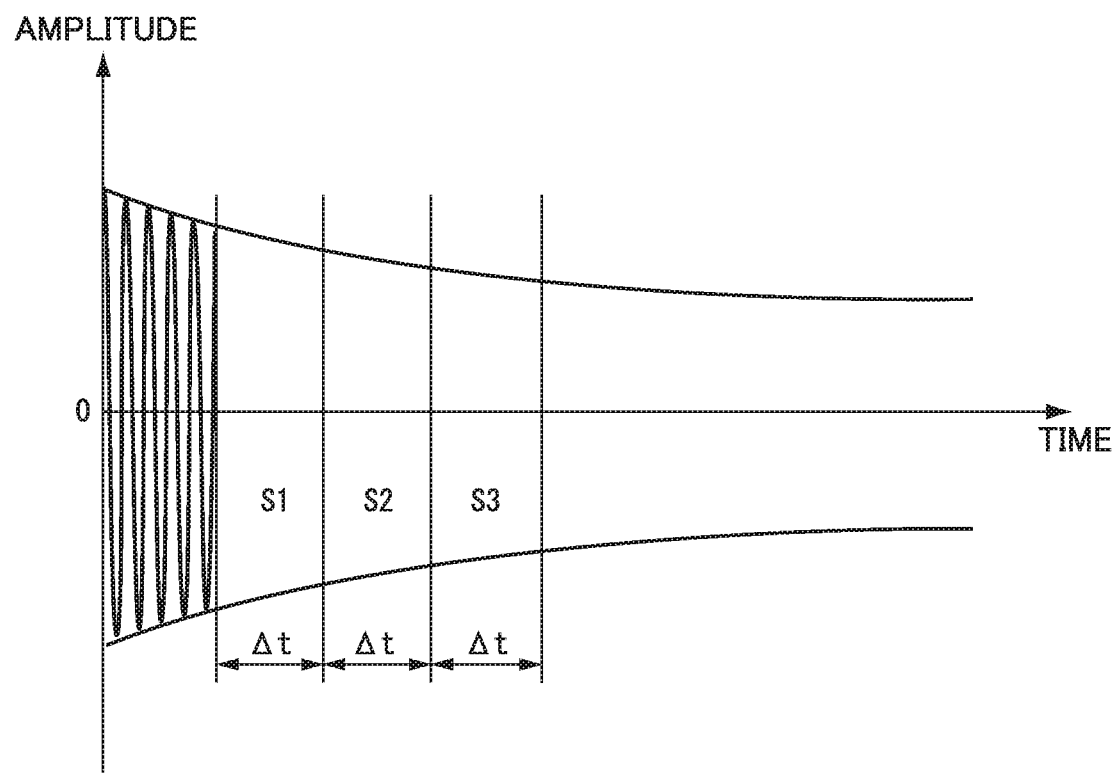
FIG. 5B is a diagram for explaining a process executed in the step S15 of the flowchart shown in FIG. 3.

FIGS. 5A and 5B are diagrams for explaining the process performed in the step S15 of the flowchart shown in FIG. 3. As shown in FIG. 5A, in the step S15, the change ratio obtainer 91 calculates a square sum $S_j$ of the sine wave output from the amplifier 3 for each period of Δt (i=1 to N). The square sum $S_j$ (j=1 to L) is expressed by the following equation (11).

$$S_1 = \sum_{i=1}^{1000} \{A \times \exp(-\zeta\omega + G1/2M)t \times \sin(\omega t)\}^2 / N \quad (11)$$
$$S_2 = \sum_{i=1001}^{2000} \{A \times \exp(-\zeta\omega + G1/2M)t \times \sin(\omega t)\}^2 / N$$
$$\vdots$$

If the sampling rate of the sine wave output from the Coriolis sensor unit 1 is 0.001 second and the sampling number N is 1000, the integration time Δt of $S_j$ is 1 second. If this is repeated L times, the total time is L seconds.

The change ratio obtainer 91 calculates a change ratio R of the adjacent square sums $S_j$ and $S_{j-1}$ in accordance with the equation (12). The change ratio obtainer 91 repeats the calculation of the equation (12) until j changes from 1 to L.

$$R = S_j/S_{j-1} = \exp\{(-2\zeta\omega + G1/M) \quad \Delta t\} \quad (12)$$

In the step S16, the change ratio obtainer 91 calculates an average value $R_{AVE}$ of the change ratios R calculated L times. Specifically, the change ratio obtainer 91 calculates the average value $R_{AVE}$ in accordance with the equation (13).

$$R_{AVE} = \sum_{n=1}^{L} (S_n/S_{n-1})/L \quad (13)$$

The change ratio obtainer 91 calculates the change ratio α1 (>1) in accordance with the equation (14). That is, the change ratio α1 (>1) is calculated as the average value $R_{AVE}$ per unit time.

$$\alpha1 = \ln(R_{AVE})/\Delta t = -2\zeta\Omega + G1/M \quad (14)$$

Next, in the step S17, at the time t1, the controller 95 sets the value of the fixed gain setting voltage E of the voltage setter 6 to a value at which the oscillation feedback current gain G becomes G2. As a result, the change ratio α of the integral value of the square value of the output value from the Coriolis sensor unit 1 becomes α2 (<1). As a result, as shown in FIG. 4A, the change ratio α is switched from α1 (>1) to α2 (<1) at the time t1. Further, as shown in FIG. 4B, the amplitude of the output signal (A sin(ωt)) from the amplifier 3, which has increased until the time t1, starts to decrease from the time t1.

Next, in the step S18, the change ratio obtainer 91 calculates the change ratio (attenuation ratio) of the amplitude of the sine wave output from the amplifier 3 for each of the periods i=1 to N until the time t2. Next, in the step S19, the change ratio obtainer 91 calculates an average value of the change ratio calculated in the step S18.

In the steps S18 and S19, processes similar to those in the steps S16 and S17 are executed, respectively. Specifically, as shown in FIG. 5B, in the step S18, the change ratio obtainer 91 calculates the square sum $S_j$ of the sine wave output from the amplifier 3 for each period of Δt (i=1 to N). Hereinafter, the change ratio obtainer 91 executes the same calculations as in the step S15 and step S16. As a result, the change ratio obtainer 91 calculates the change ratio α2 (<1) in accordance with the equation (15).

$$\alpha2 = \ln(R_{AVE})/\Delta t = -2\zeta\Omega + G2/M \quad (15)$$

Thereafter, the change ratio obtaining step S1 ends. When the change ratio obtaining step S1 ends, the switch switching step S2 is executed. In the switch switching step S2, at the time t2, the controller 95 switches the switch 7 from a side of selecting the fixed gain setting voltage E, which is the output value from the voltage setter 6, to a side of selecting the output signal ΔV from the control amplifier 5. Since it returns to the normal operation thereafter, the change ratio α becomes approximately 1, and the amplitude of the sine wave is maintained at a substantially constant value (FIG. 4A to FIG. 4C).

When the switch switching step S2 ends, the calculation step S3 is executed. In the calculation step S3, the calculator 92 calculates the entire mass M, the spring constant K, and the damping coefficient D of the U-shaped tube 20. Specifically, the calculator 92 calculates the entire mass M of the U-shaped tube 20 in accordance with the above-described equation (8).

The entire mass M varies due to corrosion of the U-shaped tube 20, but also depends on the fluid density in the tube. Therefore, the entire mass M cannot be used as a diagnostic variable. However, the calculator 92 can calculate the spring constant K and the damping coefficient D, which do not depend on the fluid density and the fluid velocity, in accordance with the equations (9) and (10).

When the calculation step S3 ends, the prediction step S4 is executed. The prediction step S4 includes steps S41 to S44. The process of the prediction step S4 is executed by the predictor 93 of the calculation controller 9. First, in the step S41, the predictor 93 calculates a change with time of the spring constant K in accordance with the spring constants K calculated in the past and the spring constant K calculated this time. For example, the predictor 93 calculates an approximate straight line or an approximate curve indicating the change with time of the spring constant K on the basis of the spring constants K calculated in the past and the spring constant K calculated this time.

Figure 6A:
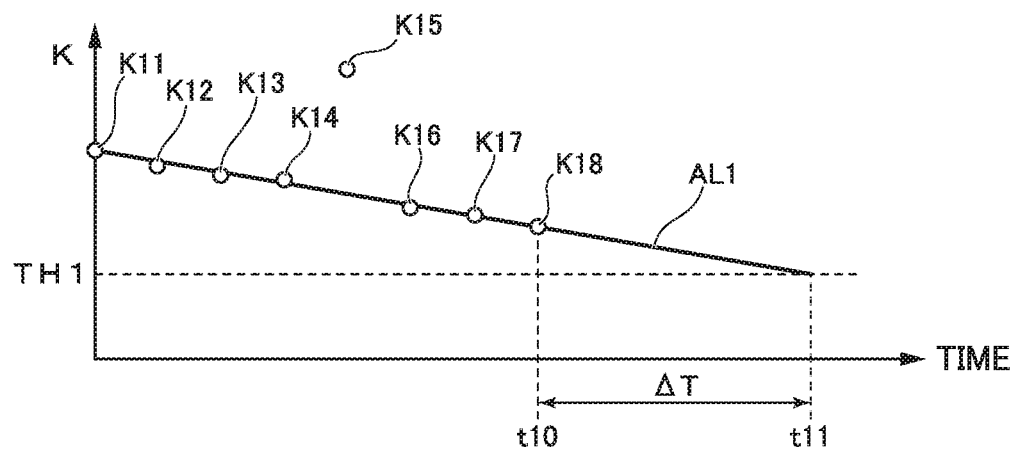
FIG. 6A is a diagram for explaining a process of calculating an approximate straight line or an approximate curve, which is executed in the calculation step.
Figure 6B:
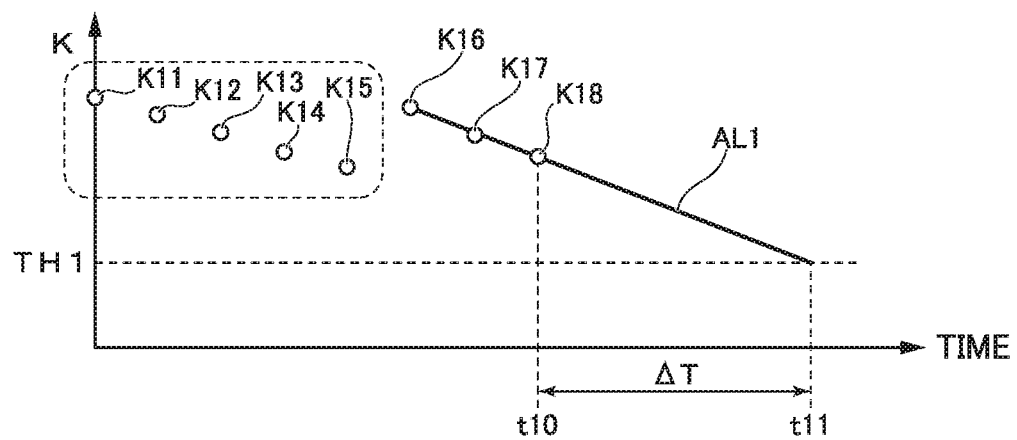
FIG. 6B is a diagram for explaining a process of calculating an approximate straight line or an approximate curve, which is executed in the calculation step.
Figure 6C:
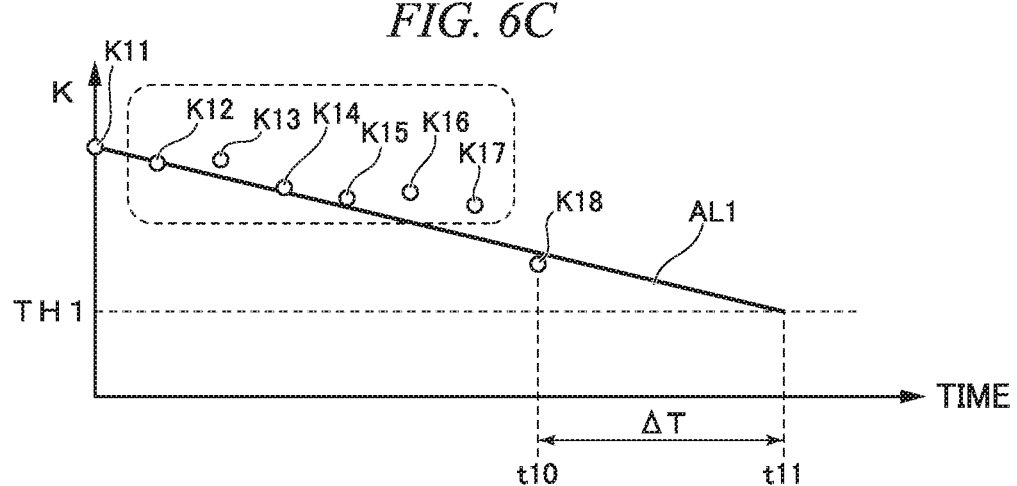
FIG. 6C is a diagram for explaining a process of calculating an approximate straight line or an approximate curve, which is executed in the calculation step.

FIG. 6A to 6C are diagrams for explaining a process of calculating the approximate straight line or the approximate curve executed in the calculation step. In order to simplify the explanation, a process of calculating an approximate straight line indicating a change with time of the spring constant K will be described as an example. When the process is started, the predictor 93 arranges the spring constants K calculated by the calculator 92 in chronological order. For example, as shown in FIG. 6A to FIG. 6C, the predictor 93 arranges the spring constants K11 to K18 in chronological order at a fixed time interval. Among the spring constants K11 to K18 shown in FIG. 6A to FIG. 6C, the spring constant K11 is the spring constant calculated earliest, and the spring constant K18 is the spring constant calculated this time.

Next, the predictor 93 calculates the approximate straight line AL1 using the spring constants K arranged in chronological order. Here, the predictor 93 calculates the approximate straight line AL1 using an arbitrary method such as the least squares method or the like. The predictor 93 may calculate the approximate straight line AL1 using all the current spring constants calculated in the past and this time, but it is not limited thereto. For example, the predictor 93 may calculate the approximate straight line AL1 using several spring constants obtained immediately before, or may calculate the approximate straight line AL1 using spring constants obtained after an arbitrary number of times of predictive diagnosis or using spring constants obtained after an arbitrary period has elapsed.

In the example shown in FIG. 6A, the spring constant K15 largely deviates from the other spring constants K11 to K14 and K16 to K18. This spring constant K15 is caused by a large error occurred due to an influence of air bubbles in the fluid or the like. When calculating the approximate straight line AL1, it is not necessary to use the spring constant which has the large error. For example, the predictor 93 may omit spring constants (for example, spring constants K15 and K16) whose difference from the previously calculated spring constant is larger than a certain value to calculate the approximate straight line AL1.

In the example shown in FIG. 6B, a discontinuity occurs between the spring constants K11 to K15 and the spring constants K16 to K18. This is because the state of the U-shaped tube 20 has changed because the U-shaped tube 20 was cleaned from the calculation of the spring constant K15 to the calculation of the spring constant K16. In this case, if the spring constants K11 to K15 obtained before the cleaning are used, the prediction accuracy becomes worse. Therefore, the predictor 93 may calculate the approximate straight line AL1 using only the spring constants K16 to K18 obtained after the cleaning.

In the example shown in FIG. 6C, the predictor 93 calculates the approximate straight line AL1 using only the spring constant K11 calculated earliest and the spring constant K18 calculated this time. Therefore, the predictor 93 excludes the spring constants K12 to K17 when calculating the approximate straight line ALL Since only the two spring constants K11 and K18 are used, the process of calculating the approximate straight line can be simplified. Thus, it is possible to reduce the load on the predictor 93 (calculation controller 9).

Next, in the step S42, the predictor 93 calculates the time required for reaching the predetermined threshold value TH1 in accordance with the change with time of the spring constant K calculated in the step S41. Here, the threshold value TH1 is a threshold value of the spring constant K, which is defined as a state in which maintenance is required. Specifically, as shown in FIG. 6A to FIG. 6C, the predictor 93 calculates the time t11 at which the approximate straight line AL1 calculated in the step S41 reaches the threshold value TH1, and calculates the time AT which is from the current time t10 to the time t11.

Next, in the step S43, the predictor 93 calculates a change with time of the damping coefficient D in accordance with the damping coefficients D calculated in the past and the damping coefficient D calculated this time. For example, the predictor 93 obtains an approximate straight line or an approximate curve indicating the change with time of the damping coefficient D in accordance with the damping coefficients D calculated in the past and the damping coefficient D calculated this time. The approximate straight line or the approximate curve showing the change with time of the damping coefficient D can be calculated by the same method as the method of calculating the approximate straight line or the approximate curve showing the change with time of the spring constant K described with reference to FIG. 6A to FIG. 6C.

Next, in the step S44, the predictor 93 calculates the time required for reaching the predetermined threshold value TH2 in accordance with the change with time of the damping coefficient D calculated in the step S43. Here, the threshold value TH2 is a threshold value of the damping coefficient D, which is defined as a state in which maintenance is required. Specifically, the same process as the process described with reference to FIG. 6A to FIG. 6C (the process for calculating the time ΔT) is performed. For example, as the adhered substances increase, the damping coefficient D increases. Therefore, the threshold value TH2 is set to a value larger than the damping coefficient D calculated this time. When the above-described process ends, the times ΔT calculated in the steps S42 and S44 are individually displayed on the display 97 provided in the calculation controller 9, but it is not limited thereto. For example, the signals indicating the times ΔT calculated in the steps S42 and S44 may be output to an external device individually. The signals indicating the times AT calculated in the steps S42 and S 44 may be output in response to a request from the external device.

Thereafter, the prediction step S4 ends. When the prediction step S4 ends, the diagnostic step S5 is executed. The diagnostic step S5 includes steps S51 to S54. The process of the diagnosis step S5 is executed by the diagnoser 94 of the calculation controller 9. First, in the step S51, the diagnoser 94 determines whether or not the spring constant K calculated using the equation (9) in the calculation step S3 is smaller than the threshold value TH1. If the diagnoser 94 determines that the constant K is smaller than the threshold value TH1 (if the determination result is "YES"), the process proceeds to the step S52. On the other hand, if the diagnoser 94 determines that the constant K is equal to or larger than the threshold value TH1 (if the determination result is "NO"), the process proceeds to the step S53.

In the step S52, the diagnoser 94 generates an alarm indicating that corrosion of the U-shaped tube 20 is progressing. When the process of step S52 ends, the process returns to the step S11. In the step S53, the diagnoser 94 determines whether or not the damping coefficient D calculated using the equation (10) in the calculation step S3 is larger than the threshold value TH2. If the diagnoser 94 determines that the damping coefficient D is larger than the threshold value TH2 (if the determination result is "YES"), the process proceeds to the step S54. On the other hand, if the diagnoser 94 determines that the damping coefficient D is equal to or less than the threshold value TH2 (if the determination result is "NO"), the process returns to the step S11. In the step S54, the diagnoser 94 generates an alarm indicating that adhesion of adhered substances to the inner wall of the U-shaped tube 20 is progressing. When the process of step S54 ends, the process returns to the step S11. The diagnoser 94 may execute the step S4 after the step S5. In addition, if the spring constant K and the damping coefficient D are calculated in the step S3, the diagnoser 94 may execute the step S4 at an arbitrary timing.

In this way, the Coriolis flowmeter of the present embodiment calculates the spring constant K and the damping coefficient D as individual parameters using the vibration equation (the equation (1)) of the U-shaped tube 20. Therefore, the state of corrosion and adhered substances of the U-shaped tube 20 can be diagnosed individually, and the maintenance timing of the Coriolis flowmeter can be predicted individually in accordance with the state of corrosion and adhered substances. Since the maintenance timing of the Coriolis flowmeter can be predicted accurately, the user can know in advance the timing when the maintenance is required, and can prepare for the maintenance in advance.

Since the Coriolis flowmeter of the present embodiment obtains the change ratio of the amplitude of the sine wave while applying an appropriate oscillation feedback current gain without stopping the exciting current, the Coriolis flowmeter can control the change ratio to be an appropriate value. Therefore, the Coriolis flowmeter of the present embodiment can accurately calculate parameters necessary for the diagnosis and the prediction. Further, the Coriolis flowmeter of the present embodiment predicts the time required for the state of the U-shaped tube 20 to become a state requiring maintenance, using the parameters calculated accurately. Therefore, the Coriolis flowmeter of the present embodiment can accurately predict the timing required for the state of the U-shaped tube 20 to become a state requiring maintenance.

The Coriolis flowmeter of the present embodiment can easily calculate the average value of the growth ratio or the attenuation ratio of the component value in an arbitrary time zone by calculating the change ratio of the square integral value of the output value from the Coriolis sensor unit 1. Since the two oscillation feedback current gains G1 and G2 are set, it is not necessary for the Coriolis flowmeter of the present embodiment to calculate a Q value. However, the Coriolis flowmeter of the present embodiment may also set the gain to zero to measure the Q value. Further, since the Coriolis flowmeter of the present embodiment calculates the difference $\alpha 1 - \alpha 2$ between the growth ratio and the attenuation ratio, an influence of disturbance such as air bubbles can be suppressed. Furthermore, since the Coriolis flowmeter of the present embodiment can arbitrarily set the change ratio, the time required for the diagnosis operation can also be shortened. For example, if the variation widths of G1 and G2 are set to be large, the Coriolis flowmeter of the present embodiment can diagnose in a short time.

As shown in FIG. 4B, since the oscillation feedback current gains G1 and G2 are set to appropriate values, the Coriolis flowmeter of the present embodiment can suppress a range of the amplitude of the U-shaped tube 20 within a range where the function of the Coriolis flowmeter can be exerted while calculating the change ratio of the amplitude of the sine wave. For this reason, the Coriolis flowmeter of the present embodiment can accurately measure the flow rate in parallel to the diagnosis operation, and can diagnose online. Further, the Coriolis flowmeter of the present embodiment takes little time to return to the normal operation. In the above-described embodiment, the Coriolis flowmeter of the present embodiment changes the amplitude from increasing to decreasing, but it is not limited to thereto. For example, as shown in FIG. 4C, the Coriolis flowmeter of the present embodiment may sequentially change the oscillation feedback current gain from G2 to G1 so that the amplitude changes from decreasing to increasing. Also in this case, the Coriolis flowmeter of the present embodiment suppresses a range of the amplitude of the U-shaped tube 20 within a range where the function of the Coriolis flowmeter can be exerted so that the flow rate can be accurately measured also in the diagnosis operation.

Further, the Coriolis flowmeter of the present embodiment calculates the change ratios $\alpha 1$ and $\alpha 2$ on the basis of the average value of the change ratio R calculated L times. Therefore, the Coriolis flowmeter of the present embodiment can accurately calculate the change ratio without being affected by disturbance, and can accurately calculate the spring constant K and the damping coefficient D. For example, if air bubbles are generated in the U-shaped tube 20, corresponding disturbance is generated in an actual waveform of the sine wave depending on the state of the generated air bubbles. However, the Coriolis flowmeter of the present embodiment calculates the change ratios R many times and averages them so that the influence of the disturbance of the sine wave due to mixing of the air bubbles can be eliminated effectively.

In the above embodiment, it is described that $\alpha 1 > 1$ and $\alpha 2 < 1$, but the Coriolis flowmeter of the present embodiment may select G1 such that $\alpha 1 = 1$, and may select G2 such that $\alpha 2 = 1$. Further, in the above embodiment, the Coriolis flowmeter of the present embodiment predicts the time required for the state of the U-shaped tube 20 to become a state requiring maintenance, but it is not limited thereto. For example, instead of the time, the Coriolis flowmeter of the present embodiment may predict an operation time of the Coriolis flowmeter, or may predict an integrated flow rate of the fluid. Corrosion of the U-shaped tube 20 and adhesion to the U-shaped tube 20 tend to progress in accordance with the flow rate of the fluid. For example, as the flow rate increases and the integrated flow rate increases, the progress of corrosion and adhesion tends to be advanced. Therefore, for example, if the flow rate of the fluid flowing in the U-shaped tube 20 fluctuates greatly, the Coriolis flowmeter of the present embodiment may not predict the time but may predict the integrated flow rate of the fluid. Thus, it is possible to accurately know the time when maintenance is required. The integrated flow rate may be either an integrated value of volume flow rate or an integrated value of mass flow rate. If a periodic inspection of the Coriolis flowmeter is performed, the fluid is removed from the U-shaped tube 20 and the Coriolis flowmeter is stopped. For this reason, corrosion and adhesion do not proceed during the periodic inspection, and the Coriolis flowmeter is not in operation. Therefore, in this case, the Coriolis flowmeter of the present embodiment may predict the operation time of the Coriolis flowmeter. Thus, it is possible to accurately know the time when maintenance is required.

In the above-described embodiment, the Coriolis flowmeter of the present embodiment, in the prediction step S4, the approximate straight line is calculated using the parameters (the spring constant K and the damping coefficient D: first parameter) calculated in the calculation step S3. However, the Coriolis flowmeter of the present embodiment may calculate the approximate straight line or the like using a parameter (second parameter) obtained by performing a predetermined calculation on the parameter obtained in the calculation step S3. For example, the Coriolis flowmeter of the present embodiment may calculate the approximate straight line or the like using a spring constant normalized with a certain spring constant K used as a reference. The normalization is performed because the spring constant K and the damping coefficient D are different depending on the diameter of the U-shaped tube 20 or the like. The Coriolis flowmeter of the present embodiment normalizes the spring constant K and the damping coefficient D so that the predictor 93 can perform the prediction calculation easily.

Processes performed in the steps S41 and S43 shown in FIG. 3 are listed below. "Step S41"

A process of calculating an approximate straight line (first approximate straight line) showing a change with time of the spring constant K (first parameter)

A process of calculating an approximate curve (first approximate curve) showing a change with time of the spring constant K (first parameter)

A process of calculating an approximate straight line (first approximate straight line) showing a change of the spring constant K (first parameter) with respect to the integrated flow rate of the fluid A process of calculating an approximate curve (first approximate curve) showing a change of the spring constant K (first parameter) with respect to the integrated flow rate of the fluid A process of calculating an approximate straight line (first approximate straight line) showing a change with time of a parameter (second parameter) obtained by performing a predetermined calculation on the spring constant K A process of calculating an approximate curve (first approximate curve) showing a change with time of a parameter (second parameter) obtained by performing a predetermined calculation on the spring constant K A process of calculating an approximate straight line (first approximate straight line) showing a change of a parameter (second parameter) obtained by performing a predetermined calculation on the spring constant K with respect to the integrated flow rate of the fluid A process of calculating an approximate curve (first approximate curve) showing a change of a parameter (second parameter) obtained by performing a predetermined calculation on the spring constant K with respect to the integrated flow rate of the fluid "Step S43"

A process of calculating an approximate straight line (second approximate straight line) showing a change with time of the damping coefficient D (first parameter)

A process of calculating an approximate curve (second approximate curve) showing a change with time of the damping coefficient D (first parameter)

A process of calculating an approximate straight line (second approximate straight line) showing a change of the damping coefficient D (first parameter) with respect to the integrated flow rate of the fluid A process of calculating an approximate curve (second approximate curve) showing a change of the damping coefficient D (first parameter) with respect to the integrated flow rate of the fluid A process of calculating an approximate straight line (second approximate straight line) showing a change with time of a parameter (second parameter) obtained by performing a predetermined calculation on the damping coefficient D A process of calculating an approximate curve (second approximate curve) showing a change with time of a parameter (second parameter) obtained by performing a predetermined calculation on the damping coefficient D A process of calculating an approximate straight line (second approximate straight line) showing a change of a parameter (second parameter) obtained by performing a predetermined calculation on the damping coefficient D with respect to the integrated flow rate A process of calculating an approximate curve (second approximate curve) showing a change of a parameter (second parameter) obtained by performing a predetermined calculation on the damping coefficient D with respect to the integrated flow rate

MODIFIED EXAMPLE

Figure 7A:
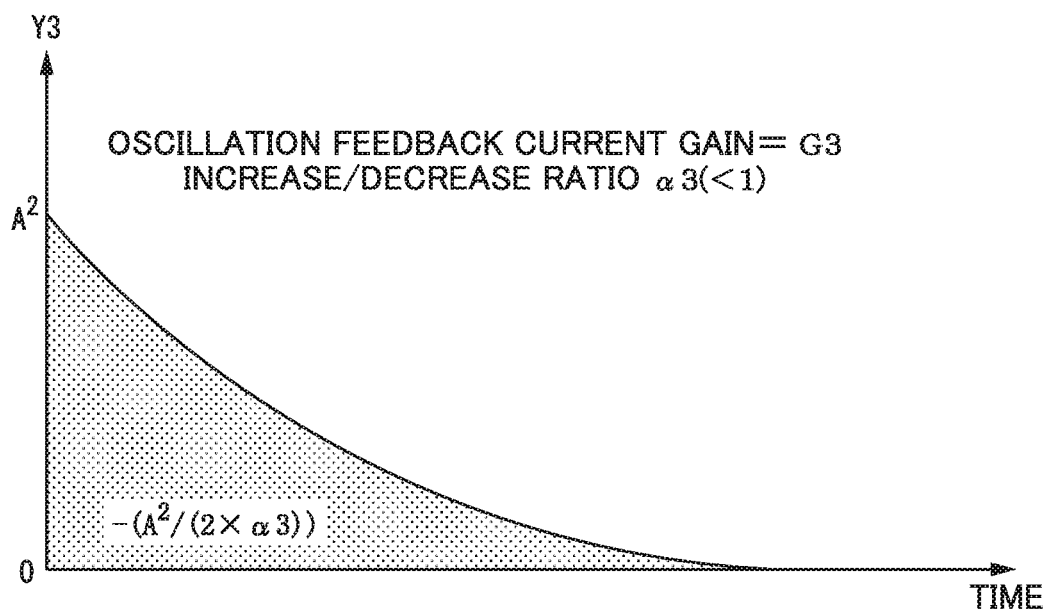
FIG. 7A is a drawing for explaining a modified example of the first embodiment of the present invention.
Figure 7B:
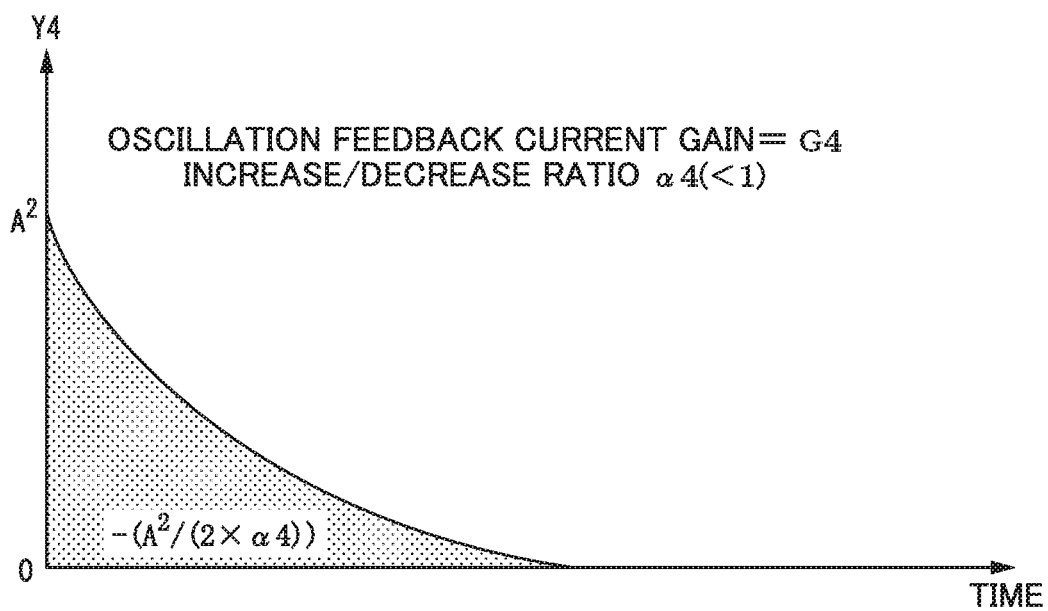
FIG. 7B is a drawing for explaining a modified example of the first embodiment of the present invention.

FIG. 7A and FIG. 7B are drawings for explaining a modified example of the first embodiment of the present invention. In this modified example, the attenuation ratio is obtained by a simple calculation. Specifically, as shown in FIG. 7A and FIG. 7B, the sine wave is attenuated while applying an appropriate oscillation feedback current gain to calculate the change ratio (attenuation ratio).

Y3 represents a square of a sine wave which is a waveform of the vibration of the U-shaped tube 20 when the oscillation feedback current gain G3 is applied to the vibrator 10. Y4 represents a square of a sine wave which is a waveform of the vibration of the U-shaped tube 20 when the oscillation feedback current gain G4 is applied to the vibrator 10. Y3 and Y4 are expressed by the following expressions.

$$Y3 = A^2 \exp(\alpha 3 \times t) \times \sin^2(\omega t)$$

$$Y4 = A^2 \exp(\alpha 4 \times t) \times \sin^2(\omega t)$$

Here, α3 is a change ratio in the oscillation feedback current gain G3, and α4 is a change ratio in the oscillation feedback current gain G4, where α3<1, α4<1, and α3≠α4.

In this case, the calculation controller 9 integrates the values of Y3 and Y4 with respect to time immediately after the oscillation feedback current gains G3 and G4 are applied to the vibrator 10, respectively. When the sine wave is sufficiently attenuated, the integral value of Y3 converges to $-(A^2/2)/\alpha 3$, and the integral value of Y4 converges to $-(A^2/2)/\alpha 4$. Therefore, the attenuation ratios α3 and α4 can be calculated in accordance with an inverse of the integral value.

As shown in the equation (5), the displacement x of the vibration of the U-shaped tube 20 is expressed by the following equation.

$$x = A \exp\{-\zeta\omega + G/(2M)\}t \times \sin(\omega t)$$

Therefore, in a case of the oscillation feedback current gain G3, α3 can be calculated in accordance with the following equation.

$$-2\zeta\Omega + G3/M = \alpha 3$$

On the other hand, in a case of the oscillation feedback current gain G4, α4 can be calculated in accordance with the following equation.

$$-2\zeta\Omega + G4/M = \alpha 4$$

Therefore, the entire mass M of the U-shaped tube 20, the spring constant K and the damping coefficient D of the U-shaped tube 20 can be calculated in accordance with the following equations (refer to the equations (9) and (10)).

$$M = (G3 - G4)/(\alpha 3 - \alpha 4)$$

$$K = M \times \omega^2$$

$$D = G3 - \alpha 3 \times M$$

The amplitude A can be calculated in accordance with an effective value of A sin(ωt) in the normal operation (the output of the smoothing circuit 4 shown in FIG. 1).

In this way, in this modified example, the attenuation ratio can be obtained by a simple calculation. On the other hand, when calculating the attenuation ratio, the region where the sine wave is sufficiently attenuated is used. For this reason, in comparison with the procedure of the first embodiment described with reference to FIG. 3, the procedure of the modified example has a disadvantage that it is easy to be influenced by disturbance.

Second Embodiment

<Configuration of Timing Prediction System>

Figure 8:
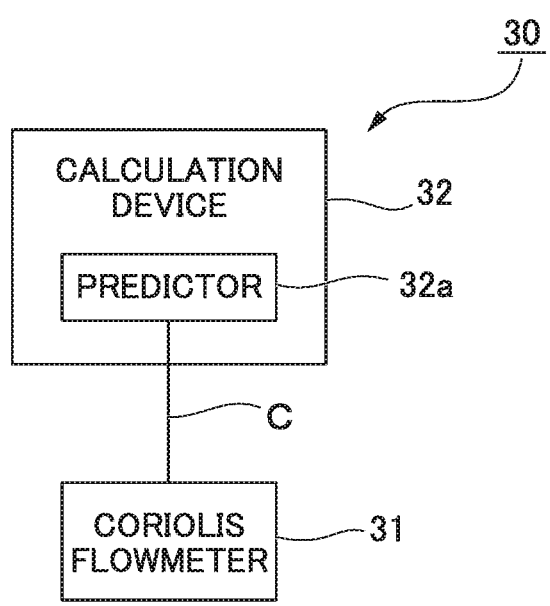
FIG. 8 is a block diagram showing a configuration of a main part of a timing prediction system according to a second embodiment of the present invention.

FIG. 8 is a block diagram showing a configuration of a main part of a timing prediction system according to a second embodiment of the present invention. As shown in FIG. 8, the timing prediction system 30 of the present embodiment includes a Coriolis flowmeter 31 and a calculation device 32. The Coriolis flowmeter 31 and the calculation device 32 are connected to each other via a communication path C, such as a wired or wireless network, a communication line, a transmission line, and so on. The Coriolis flowmeter 31 and the calculation device 32 can transmit and receive various data to and from each other.

The Coriolis flowmeter 31 has substantially the same configuration as that of the Coriolis flowmeter shown in FIG. 1, and the Coriolis flowmeter 31 measures the flow rate of the fluid flowing through the U-shaped tube 20 on the basis of the Coriolis force acting on the U-shaped tube 20 vibrated by applying a driving force by the vibrator 10. Here, in the Coriolis flowmeter 31 of the present embodiment, the predictor 93 shown in FIG. 1 may be omitted. The Coriolis flowmeter 31 of the present embodiment can output parameters calculated by the calculator 92 to an external device via the communication path C.

The calculation device 32 performs a predetermined calculation on data output from the Coriolis flowmeter 31 and transmitted via the communication path C. The calculation device 32 includes a predictor 32a corresponding to the predictor 93 shown in FIG. 1. The predictor 32a performs the same process as the process described with reference to FIG. 6A to FIG. 6C. For example, the calculation device 32 is realized by a PLC (Programmable Logic Controller), a PC (Personal Computer), a workstation, or the like.

<Operation of Timing Prediction System>

The Coriolis flowmeter 31 repeatedly performs the processes (the change ratio obtaining step S1, the switch switching step S2, the calculation step S3, and the diagnosis step S5) except for the prediction step S4 of the flowchart shown in FIG. 3. Every time the calculation step S3 ends, the Coriolis flowmeter 31 transmits the parameters (the spring constant K and the damping coefficient D of the U-shaped tube 20) calculated in the calculation step S3 to the calculation device 32 via the communication path C.

The predictor 32a of the calculation device 32 performs the process of the prediction step S4 of the flowchart shown in FIG. 3 every time the parameters are transmitted from the Coriolis flowmeter 31. The timing at which the predictor 32a performs the process of the prediction step S4 of the flowchart shown in FIG. 3 may be arbitrary. Therefore, the predictor 32a may perform the process of the prediction step S4 of the flowchart shown in FIG. 3 at a different timing from the timing at which the parameters are transmitted from the Coriolis flowmeter 31.

As described above, the Coriolis flowmeter, the timing prediction system, and the timing prediction method according to the embodiment of the present invention calculates the spring constant K and the damping coefficient D of the U-shaped tube 20 as mutually individual parameters in accordance with the change ratio obtained by the change ratio obtainer 91 and the equation of motion of the U-shaped tube 20. Further, using the calculated parameters, the Coriolis flowmeter, the timing prediction system, and the timing prediction method according to the embodiment of the present invention predicts the time, the operating time, or the integrated flow rate of the fluid required for the state of the U-shaped tube 20 to become a state requiring maintenance. As described above, the embodiment of the present invention can accurately predict the timing when maintenance is required.

Specifically, the Coriolis flowmeter according to the embodiment of the present invention includes a Coriolis sensor unit 1, a current amplifier 2, an amplifier 3, a smoothing circuit 4, a control amplifier 5, a voltage setter 6, a switch 7, a multiplier 8, and a calculation controller 9. The Coriolis sensor unit 1 detects a vibration of a U-shaped tube 20 to output a first output signal. The current amplifier 2 supplies a drive current for vibrating the U-shaped tube 20 to the Coriolis sensor unit 1. The amplifier 3 amplifies the first output signal output from the Coriolis sensor unit 1 to output a second output signal. The smoothing circuit 4 smooths the second output signal output from the amplifier 3 to output a third output signal. The control amplifier 5 amplifies a difference between the third output signal output from the smoothing circuit 4 and a target voltage to output a fourth output signal. The voltage setter 6 outputs a fixed gain setting voltage. The switch 7 selects one signal of the fourth output signal output from the control amplifier 5 and the fixed gain setting voltage output from the voltage setter 6. The multiplier 8 multiplies the second output signal output from the amplifier 3 by the signal selected by the switch 7 to output a fifth output signal to the current amplifier 2. The calculation controller 9 controls the voltage setter 6 and the switch 7. The current amplifier 2 amplifies the fifth output signal output from the multiplier 8 to generate the drive current.

The calculation controller 9 includes a change ratio obtainer 91, a calculator 92, and a predictor 93. The change ratio obtainer 91 obtains a change ratio of the vibration of the U-shaped tube 20 when the U-shaped tube 20 is vibrated with a constant driving force by causing the switch 7 to select the fixed gain setting voltage. The calculator 92 calculates a first parameter indicating at least one of a spring constant of the U-shaped tube 20 and a damping coefficient of the U-shaped tube 20 on the basis of the change ratio obtained by the change ratio obtainer 91 and the constant driving force. The predictor 93 predicts at least one of a time, an operating time, and an integrated flow rate of a fluid flowing in the U-shaped tube 20 required for a state of the U-shaped tube 20 to become a state requiring maintenance, using the first parameter calculated by the calculator 92 or a second parameter obtained by performing a predetermined calculation on the first parameter.

Thus, the Coriolis flowmeter according to the embodiment of the present invention can accurately predict the timing when maintenance is required.

The scope of application of the present invention is not limited to the above embodiment. The present invention can be widely applied to a Coriolis flowmeter that measures a flow rate of material flowing through a vibration tube on the basis of a Coriolis force acting on the vibration tube vibrated by applying a driving force.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A Coriolis flowmeter comprising:
   a Coriolis sensor unit configured to detect a vibration of a vibration tube to output a first output signal;
   a current amplifier configured to supply a drive current for vibrating the vibration tube to the Coriolis sensor unit;
   an amplifier configured to amplify the first output signal output from the Coriolis sensor unit to output a second output signal;
   a smoother configured to smooth the second output signal output from the amplifier to output a third output signal;
   a control amplifier configured to amplify a difference between the third output signal output from the smoother and a target voltage to output a fourth output signal;
   a voltage setter configured to output a fixed gain setting voltage;
   a switch configured to select either the fourth output signal or the fixed gain setting voltage;
   a multiplier configured to multiply the second output signal output from the amplifier by the fourth signal or the fixed gain setting voltage selected by the switch to output a fifth output signal to the current amplifier; and
   a hardware processor configured to control the voltage setter and the switch,
   wherein the current amplifier is configured to amplify the fifth output signal output from the multiplier to generate the drive current,
   wherein the hardware processor is configured to:
      obtain a growth ratio of an integral value of a square value of an output value from the Coriolis sensor unit when the switch is caused to select a first gain;
      obtain an attenuation ratio of the integral value of the square value of the output value from the Coriolis sensor unit when the switch is caused to select a second gain which is smaller than the first gain;
      calculate a first parameter indicating at least one of a spring constant of the vibration tube and a damping coefficient of the vibration tube on the basis of the growth ratio, the attenuation ratio, the first gain, and the second gain; and
      predict a time required for a state of the vibration tube to become a state requiring maintenance, using the first parameter or a second parameter obtained by performing a predetermined calculation on the first parameter.

2. The Coriolis flowmeter according to claim 1,
   wherein the hardware processor is configured to calculate an approximate straight line or an approximate curve indicating a change with time of the first parameter or the second parameter, and
   wherein the hardware processor is configured to predict the time required for the approximate straight line or the approximate curve to reach a threshold value defined as a state requiring the maintenance.

3. The Coriolis flowmeter according to claim 2,
   wherein the hardware processor is configured to calculate the approximate straight line or the approximate curve using at least two of the first parameters or the second parameters obtained at different times.

4. The Coriolis flowmeter according to claim 2,
   wherein the hardware processor is configured to calculate a spring constant of the vibration tube as the first parameter,
   wherein the hardware processor is configured to calculate a first approximate straight line or a first approximate curve showing a change with time of the first parameter or the second parameter related to the spring constant, and
   wherein the hardware processor is configured to calculate the time required for the first approximate straight line or the first approximate curve to reach a first threshold value which is related to the spring constant and defined as a state requiring the maintenance.

5. The Coriolis flowmeter according to claim 2,
   wherein the hardware processor is configured to calculate a damping coefficient of the vibration tube as the first parameter,
   wherein the hardware processor is configured to calculate a second approximate straight line or a second approximate curve showing a change with time of the first parameter or the second parameter related to the damping coefficient, and
   wherein the hardware processor is configured to calculate the time required for the second approximate straight line or the second approximate curve to reach a second threshold value which is related to the damping coefficient and defined as a state requiring the maintenance.

6. The Coriolis flowmeter according to claim 1,
   wherein the hardware processor is configured to diagnose a state of the vibration tube on the basis of the first parameter calculated by the hardware processor.

7. The Coriolis flowmeter according to claim 1,
   wherein the hardware processor is configured to measure the flow rate of the fluid flowing in the vibration tube on the basis of the second output signal output from the amplifier.

8. The Coriolis flowmeter according to claim 1,
   wherein the hardware processor is configured to calculate an entire mass of the vibration tube on the basis of the change ratio obtained by the hardware processor and the constant oscillation feedback gain.

9. The Coriolis flowmeter according to claim 8,
   wherein the hardware processor is configured to:
   calculate the change ratio α1 on the basis of the second output signal output from the amplifier when the oscillation feedback gain is G1;

calculate the change ratio α2 on the basis of the second output signal output from the amplifier when the oscillation feedback gain is G2; and calculate the entire mass M of the vibration tube by dividing (G1-G2) by (α1-α2).

10. The Coriolis flowmeter according to claim 9,
wherein the hardware processor is configured to measure an angular frequency ω of the vibration of the vibration tube on the basis of the second output signal output from the amplifier, and
wherein the hardware processor is configured to calculate the spring constant K by multiplying M and $ω^2$.

11. The Coriolis flowmeter according to claim 9,
wherein the hardware processor is configured to measure an angular frequency ω of the vibration of the vibration tube on the basis of the second output signal output from the amplifier, and
wherein the hardware processor is configured to calculate the damping coefficient D by subtracting a value obtained by multiplying α1 and M from G1.

12. A timing prediction system comprising:
a Coriolis flowmeter; and
a calculation device connected to the Coriolis flowmeter,
wherein the Coriolis flowmeter comprises:
    a Coriolis sensor unit configured to detect a vibration of a vibration tube to output a first output signal;
    a current amplifier configured to supply a drive current for vibrating the vibration tube to the Coriolis sensor unit;
    an amplifier configured to amplify the first output signal output from the Coriolis sensor unit to output a second output signal;
    a smoother configured to smooth the second output signal output from the amplifier to output a third output signal;
    a control amplifier configured to amplify a difference between the third output signal output from the smoother and a target voltage to output a fourth output signal;
    a voltage setter configured to output a fixed gain setting voltage;
    a switch configured to select either the fourth output signal or the fixed gain setting voltage;
    a multiplier configured to multiply the second output signal output from the amplifier by the fourth signal or the fixed gain setting voltage selected by the switch to output a fifth output signal to the current amplifier; and
    a first hardware processor configured to control the voltage setter and the switch,
wherein the current amplifier is configured to amplify the fifth output signal output from the multiplier to generate the drive current, wherein the first hardware processor is configured to:
    obtain a growth ratio of an integral value of a square value of an output value from the Coriolis sensor unit when the switch is caused to select a first gain;
    obtain an attenuation ratio of the integral value of the square value of the output value from the Coriolis sensor unit when the switch is caused to select a second gain which is smaller than the first gain; and
    calculate a first parameter indicating at least one of a spring constant of the vibration tube and a damping coefficient of the vibration tube on the basis of the growth ratio, the attenuation ratio, the first gain, and the second gain, wherein the calculation device comprises a second hardware processor configured to:
    predict a time required for a state of the vibration tube to become a state requiring maintenance, using the first parameter or a second parameter obtained by performing a predetermined calculation on the first parameter.

13. The timing prediction system according to claim 12,
wherein the second hardware processor is configured to calculate an approximate straight line or an approximate curve indicating a change with time of the first parameter or the second parameter, and
wherein the second hardware processor is configured to predict the time required for the approximate straight line or the approximate curve to reach a threshold value defined as a state requiring the maintenance.

14. The timing prediction system according to claim 13,
wherein the second hardware processor is configured to calculate the approximate straight line or the approximate curve using at least two of the first parameters or the second parameters obtained at different times.

15. The timing prediction system according to claim 13,
wherein the first hardware processor is configured to calculate a spring constant of the vibration tube as the first parameter,
wherein the second hardware processor is configured to calculate a first approximate straight line or a first approximate curve showing a change with time of the first parameter or the second parameter related to the spring constant, and
wherein the second hardware processor is configured to calculate the time required for the first approximate straight line or the first approximate curve to reach a first threshold value which is related to the spring constant and defined as a state requiring the maintenance.

16. The timing prediction system according to claim 13,
wherein the first hardware processor is configured to calculate a damping coefficient of the vibration tube as the first parameter,
wherein the second hardware processor is configured to calculate a second approximate straight line or a second approximate curve showing a change with time of the first parameter or the second parameter related to the damping coefficient, and
wherein the second hardware processor is configured to calculate the time required for the second approximate straight line or the second approximate curve to reach a second threshold value which is related to the damping coefficient and defined as a state requiring the maintenance.

17. The timing prediction system according to claim 12,
wherein the first hardware processor is configured to diagnose a state of the vibration tube on the basis of the first parameter calculated by the first hardware processor.

18. The timing prediction system according to claim 12,
wherein
the first hardware processor is configured to measure the flow rate of the fluid flowing in the vibration tube on the basis of the second output signal output from the amplifier.

19. The timing prediction system according to claim 12,
wherein the first hardware processor configured to calculate an entire mass of the vibration tube on the basis of the change ratio obtained by the first hardware processor and the constant oscillation feedback gain.

20. A timing prediction method using a Coriolis flowmeter which comprises a Coriolis sensor unit, a current amplifier, an amplifier, a smoother, a control amplifier, a voltage setter, a switch, a multiplier, and a hardware processor, the timing prediction method comprising:
- detecting, by the Coriolis sensor unit, a vibration of a vibration tube to output a first output signal;
- supplying, by the current amplifier, a drive current for vibrating the vibration tube to the Coriolis sensor unit;
- amplifying, by the amplifier, the first output signal output from the Coriolis sensor unit to output a second output signal;
- smoothing, by the smoother, the second output signal output from the amplifier to output a third output signal;
- amplifying, by the control amplifier, a difference between the third output signal output from the smoother and a target voltage to output a fourth output signal;
- outputting a fixed gain setting voltage by the voltage setter;
- selecting, by the switch, either the fourth output signal or the fixed gain setting voltage;
- multiplying, by the multiplier, the second output signal output from the amplifier by the fourth signal or the fixed gain setting voltage selected by the switch to output a fifth output signal to the current amplifier;
- controlling the voltage setter and the switch by the hardware processor;
- amplifying, by the current amplifier, the fifth output signal output from the multiplier to generate the drive current;
- obtaining, by the hardware processor, a growth ratio of an integral value of a square value of an output value from the Coriolis sensor unit when the switch is caused to select a gain;
- obtaining, by the hardware processor, an attenuation ratio of the integral value of the square value of the output value from the Coriolis sensor unit when the switch is caused to select a second gain which is smaller than the first gain;
- calculating, by the hardware processor, a first parameter indicating at least one of a spring constant of the vibration tube and a damping coefficient of the vibration tube on the basis of the growth ratio, the attenuation ratio, the first gain, and the second gain; and
- predicting, by the hardware processor, a time required for a state of the vibration tube to become a state requiring maintenance, using the first parameter or a second parameter obtained by performing a predetermined calculation on the first parameter.

* * * * *